(12) United States Patent
Lauzon et al.

(10) Patent No.: US 7,890,931 B2
(45) Date of Patent: Feb. 15, 2011

(54) VISUAL DEBUGGER FOR STYLESHEETS

(75) Inventors: David Martin Lauzon, Etobicoke (CA); Christina P. Lau, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 2341 days.

(21) Appl. No.: 10/458,452

(22) Filed: Jun. 10, 2003

(65) Prior Publication Data

US 2004/0117769 A1 Jun. 17, 2004

(30) Foreign Application Priority Data

Dec. 16, 2002 (CA) .................................. 2414479

(51) Int. Cl.
*G06F 9/44* (2006.01)
*G06F 17/25* (2006.01)

(52) U.S. Cl. ................ 717/125; 717/105; 717/113; 715/235; 715/236

(58) Field of Classification Search .............. None
See application file for complete search history.

(56) References Cited

U.S. PATENT DOCUMENTS

| | | | |
|---|---|---|---|
| 4,648,044 A | 3/1987 | Hardy et al. | |
| 4,885,717 A | 12/1989 | Beck et al. | |
| 5,535,318 A | 7/1996 | Motoyama et al. | |
| 5,926,638 A | 7/1999 | Inoue | |
| 5,987,248 A | 11/1999 | Murayama et al. | |
| 5,995,744 A | 11/1999 | Guccione | |
| 6,012,098 A | 1/2000 | Bayeh et al. | |
| 6,026,362 A | 2/2000 | Kim et al. | |
| 6,131,185 A | 10/2000 | Coskun et al. | |
| 6,240,545 B1 | 5/2001 | Carmichael et al. | |
| 6,275,956 B1 | 8/2001 | On et al. | |
| 6,286,132 B1 | 9/2001 | Tanaka et al. | |
| 6,337,710 B1 | 1/2002 | Watkins | |
| 6,347,307 B1 | 2/2002 | Sandhu et al. | |
| 6,585,778 B1 * | 7/2003 | Hind et al. ................ | 715/235 |
| 6,996,781 B1 * | 2/2006 | Myers et al. ................ | 715/763 |
| 7,036,072 B1 * | 4/2006 | Sulistio et al. ............ | 715/517 |
| 7,058,886 B1 * | 6/2006 | Sulistio et al. ............ | 715/517 |

(Continued)

OTHER PUBLICATIONS

Ovidiu Predescu and Tony Addyman, "XSLT-process minor mode", Jan. 2003, version 2.2, accesed from World Wide Web <http://xslt-process.sourceforge.net/xslt-process.pdf>, pp. 1-21.*

(Continued)

*Primary Examiner*—Thuy Dao
(74) *Attorney, Agent, or Firm*—Yee & Associates, P.C.; Justin M. Dillon

(57) ABSTRACT

A visual Debugger for stylesheets assists a user of stylesheets debug the stylesheets by: allowing the user to set breakpoints on the stylesheet; running to, and stopping at, the breakpoints; single stepping through each template rule as the rule is fired (both forward and backward); evaluating the template rule on the fly; showing the relationship between each template rule and the source document that provides the data; supporting stylesheets that call external programs written in Java or JavaScript; supporting stylesheets that include or import other stylesheets; supporting XML documents that use the "?xml-stylesheet" processing instruction to include stylesheets; supporting multiple debug sessions; and allowing the user to edit the stylesheet or source document and then allowing the debugger to be relaunched.

20 Claims, 7 Drawing Sheets

U.S. PATENT DOCUMENTS

| | | | |
|---|---|---|---|
| 7,620,937 B2 * | 11/2009 | Narayana et al. | 717/124 |
| 2003/0079159 A1 * | 4/2003 | Ten-Hove et al. | 714/34 |
| 2004/0034830 A1 * | 2/2004 | Fuchs et al. | 715/501.1 |
| 2010/0017788 A1 * | 1/2010 | Bronkhorst et al. | 717/125 |

OTHER PUBLICATIONS

Ovidiu Predescu and Tony Addyman, "XSLT processing and debuggin within Emacs", Aug. 7, 2002, version 1.14, accessed from World Wide Web <http://xslt-process.cvs.sourceforge.net/xslt-process/xslt-process/doc/xslt-process.texi.in?revision=1.14&view=markup>, pp. 1-21 (lines 1-1291).*

"An incremental XSLT transformation processor for XML document manipulation", Villard et al., May 2002, pp. 474-485, <http://delivery.acm.org/10.1145/520000/511508/p474-yillard.pdf>.*

"An XML-based document suite", Rosner et al., Aug. 2002, pp. 1-5, <http://delivery.acm.org/10.1145/1080000/1071902/p18-rosner.pdf>.*

Patent Application CA9-2002-0002US1 "Dynamic generation of Program Execution Trace Files in a Standard markup Language" U.S. Appl. No. 10/411467, filed Apr. 10, 2003.

Research Disclosure, Verification of test scripts using XML DTDs, Mar. 2001, Article Number 443127, p. 466.

http://www.vbxml.com/xsldebugger/ XSLDebugger, a Visual XSLT Debugger.

IPSJ Journal Abstract vol. 37 No. 07-007 "Parallel Visualizing Debugger" (abstract only).

* cited by examiner

```xml
<?xml version="1.0" encoding="UTF-8"?>
<?xml-stylesheet type="text/xsl" href="./familyTree.xsl"?>
<person name="Otto">
    <person name="Sandra">
        <person name="Jeremy">
            <person name="Eliana"/>
        </person>
        <person name="Eric">
            <person name="Aidan"/>
        </person>
        <person name="Philip">
            <person name="Alex"/>
            <person name="Andy"/>
        </person>
    </person>
</person>
```

FIG. 4

```
<?xml version="1.0" encoding="UTF-8"?>
<xsl:stylesheet version="1.0" xmlns:xsl="http://www.w3.org/1999/XSL/Transform">
    <xsl:output method="html"/>

<!-- processing begins here -->
<xsl:template match="/">
    <html>
        <body>
            <!-- select the top level person -->
            <xsl:apply-templates select="person">
                <xsl:with-param name="level" select="'0'"/>
            </xsl:apply-templates>
        </body>
    </html>
</xsl:template>

<!-- Output information for a person and recursively select
     all children. -->
<xsl:template match="person">
    <xsl:param name="level"/>

<!-- indent according to the level -->
    <div style="text-indent:{$level}em">
        <xsl:value-of select="name"/>
    </div>

<!-- recursively select children, incrementing the level -->
    <xsl:apply-templates select="person">
        <xsl:with-param name="level" select="$level + 1"/>
    </xsl:apply-templates>
</xsl:template>
</xsl:stylesheet>
```

FIG. 5

```
<!-- processing begins here -->
<xsl:template match="/">
    <html>
        <body>
            <!-- select the top level person -->
            <xsl:apply-templates select="person">
                <xsl:with-param name="level" select="="/>
            </xsl:apply-templates>
        </body>
    </html>
</xsl:template>

<!-- Output information for a person and recursively
     all children. -->
<xsl:template match="person">
    <xsl:param name="level"/>
    <!-- indent according to the level -->
    <div style="text-indent:{$level}em">
        <xsl:value-of select="name"/>
    </div>
    <!-- recursively select children, incrementing the
    <xsl:apply-templates select="person">
        <xsl:with-param name="level" select="$level +
    </xsl:apply-templates>
</xsl:template>
</xsl:stylesheet>
```

FIG. 6

| Name-Template | Match Template | Priority | Mode |
|---|---|---|---|
| | / | | -Infinity |
| | person | | -Infinity |
| | person | | -Infinity |
| | person | | -Infinity |

Current XSL Element | XSL Breakpoints | Template Call Stack | Tasks

VISUAL DEBUGGER FOR STYLESHEETS

FIELD OF THE INVENTION

The present invention relates to working with stylesheets and, more specifically, to a visual debugger for stylesheets.

BACKGROUND OF THE INVENTION

The World Wide Web Consortium (W3C) describes the eXtensible Stylesheet Language (XSL) as a language for expressing stylesheets. Where a "stylesheet", a term extended from print publishing to online media, is a definition of the appearance of a document. XSL consists of three parts. The first part is XSL Transformations (XSLT), a language for transforming eXtensible Markup Language (XML) documents. The second part is the XML Path Language (XPath), an expression language used by XSLT to access, or to refer to, parts of an XML document. The third part is XSL Formatting Objects, an XML vocabulary for specifying formatting semantics.

An XSL stylesheet consists of a set of elements called templates. Each template is surrounded by <xsl: template> tags and contains rules to apply when a specified pattern is matched.

Developing XSL stylesheets can be very complicated and error-prone due to the declarative and recursive nature of the XSL language. Often it is difficult to determine, after the application of an XSL stylesheet to an XML document, which template rule has fired (i.e., which template rule has been used) and which pattern has been matched.

Clearly there is a need for an improved debugger to help the developer of stylesheets to debug stylesheets under development.

SUMMARY OF THE INVENTION

A visual Debugger for stylesheets is provided to assist a user of stylesheets to debug the stylesheets. The debugger provides a visual environment (display) from which a source document and a stylesheet to be applied to the source document may be selected. During the application of the selected stylesheet to the source document, the debugger receives events from the stylesheet processor and updates the visual environment based on the received event.

The visual debugger may have many features including: allowing the user to set breakpoints on the stylesheet; running to, and stopping at, the breakpoints; single stepping through each template rule as the rule is fired (both forward and backward); evaluating the template rule on the fly; showing the relationship between each template rule and the source document that provides the data; supporting stylesheets that call external programs written in Java or JavaScript; supporting stylesheets that include or import other stylesheets; supporting XML documents that use the "?xml-stylesheet" processing instruction to include stylesheets; supporting multiple debug sessions; and allowing the user to edit the stylesheet or source document and then allowing the debugger to be relaunched.

In accordance with an aspect of the present invention there is provided a computer readable medium containing computer-executable instructions which, when performed by a processor in a computer system, cause the computer system to provide a display of a source document and a stylesheet to be applied to the source document, instruct a stylesheet processor to launch application of the stylesheet to the source document, receive a plurality of events from the stylesheet processor, where the plurality of events relate to the application, by the stylesheet processor, of the stylesheet to the source document and update the display based on the plurality of events.

In accordance with another aspect of the present invention there is provided a stylesheet debugging system. The stylesheet debugging system includes a display monitor adapted to provide a display of a source document and a stylesheet to be applied to the source document. The stylesheet debugging system also includes a processor adapted to instruct a stylesheet processor to launch application of the stylesheet to the source document, receive a plurality of events from the stylesheet processor, where the plurality of events relate to the application of the stylesheet to the source document and update the display based on the plurality of events.

In accordance with another a further aspect of the present invention there is provided a method of providing support for stylesheet debugging. The method includes providing a user interface including a display, the user interface adapted to receive an indication of a source document and a stylesheet to be applied to the source document, instructing a stylesheet processor to launch application of the stylesheet to the source document, receiving a plurality of events from the stylesheet processor, where the plurality of events relate to the application of the stylesheet to the source document and updating the display based on the plurality of events. Additionally, there is provided a computer readable medium for allowing a general purpose computer to perform this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 4 illustrates an exemplary source xml document;

FIG. 5 illustrates an exemplary xsl stylesheet for application to the exemplary source xml document of FIG. 4;

FIG. 6 illustrates an exemplary XSL editor window according to an embodiment of the present invention; and FIG. 7 illustrates an exemplary Template Call Stack view according to an embodiment of the present invention.

DETAILED DESCRIPTION

The developer of an XSL stylesheet (i.e., the potential user of a visual debugger for stylesheets) has, generally, initially generated an XSL stylesheet, perhaps using an editor optimized for editing XSL stylesheets. The developer then wishes to test (debug) the generated XSL stylesheet. Such testing involves applying the generated XSL stylesheet to a source XML document. The application of the generated XSL stylesheet to the source XML document is said to "transform" the source XML document. This transformation results in the creation of a new document, where the new document may be formatted, for example, in the Hyper-Text Markup Language (HTML), XML or text. The new HTML, XML or text document may then be opened in a typical Web browser, such as Microsoft® Internet Explorer or Netscape® Navigator.

To apply an XSL stylesheet to an XML document, a "processor" application is required. One processor known to the applicant is the "Xalan" processor. The Xalan processor is an XSLT processor that transforms XML documents into documents formatted as HTML, text or another XML file type. The Xalan processor implements the W3C Recommendations for XSL Transformations (XSLT) and the XML Path Language (XPath) (For more information on the Xalan processor, see http://xml.apache.org/xalan-j/).

Aspects of the visual debugger for stylesheets of the present invention enable a user to visually step through an XSL transformation script (i.e., an XSLT stylesheet). While the user steps through the script, the user may highlight transformation rules as the rules are fired. Thus, the user may be shown the relationship between each rule and the source document.

Figure 1:
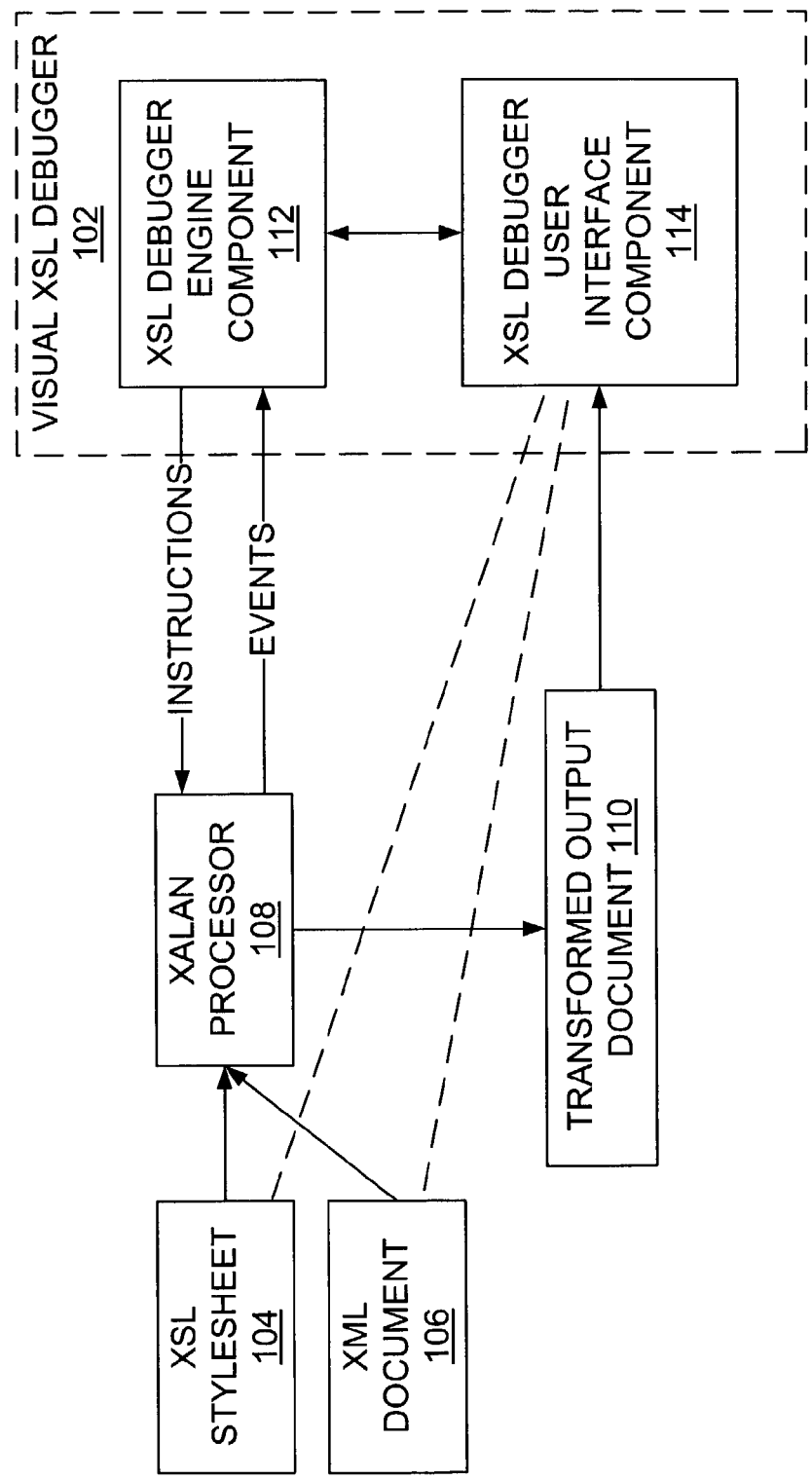
FIG. 1 schematically illustrates a visual debugger for stylesheets in combination with input to, and output from, a stylesheet processor according to an embodiment of the present invention.

In overview, the challenges inherent in providing a visual debugger for stylesheets are met by two new components, namely a "user interface" component and an "engine" component. A visual XSL Debugger 102 is logically illustrated in FIG. 1. As shown, the visual XSL Debugger 102 includes an XSL Debugger user interface component 114 and an XSL Debugger engine component 112. In normal operation, under control of XSL Debugger user interface component 114, a Xalan processor 108 receives an XML document 106 and applies an XSL stylesheet 104 to the XML document 106 to result in a transformed output document 110. The visual XSL Debugger 102 interacts with the Xalan processor 108 in that the XSL Debugger engine component 112 receives notification of events from the Xalan processor 108 as the XSL stylesheet 104 is applied to the XML document 106. These events are collected and stored. The stored events are then interpreted by the XSL Debugger engine component 112. Later, responsive to commands received from a user interacting with the XSL Debugger user interface component 114, the XSL Debugger engine component 112 performs a simulation of the application of the XSL stylesheet 104 to the XML document 106, where the simulation is based on the stored and interpreted events. During the simulation, the display presented by the XSL Debugger user interface component 114 is updated appropriately.

The XSL Debugger engine component 112 also sends instructions to the Xalan processor 108, for instance, indications of the source XML document 106 and the XSL stylesheet 104 to apply to the source XML document 106. The identities of the source XML document 106 and the XSL stylesheet 104 to apply to the source XML document 106, are sent to the Xalan processor 108 after having been received by the XSL Debugger engine component 112 from the XSL Debugger user interface component 114. Additionally, the transformed output document 110 may be presented by the XSL Debugger user interface component 114.

Figure 2:
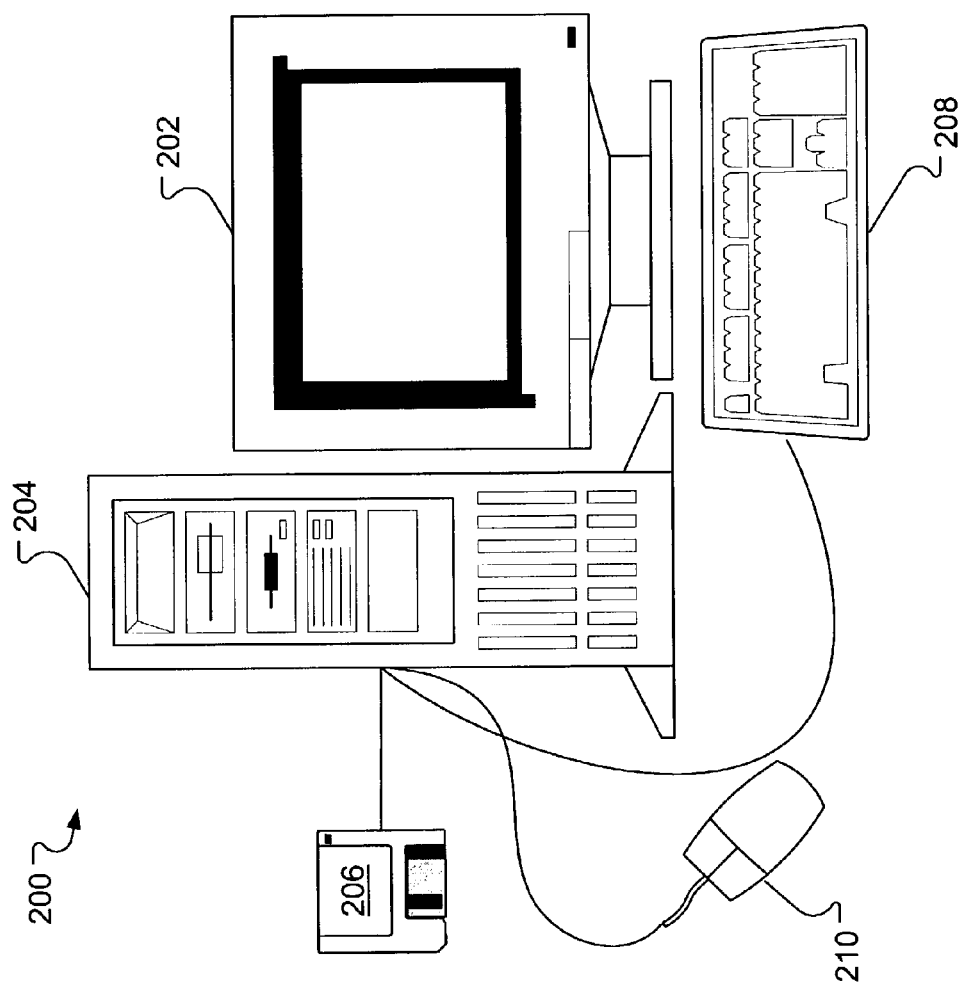
FIG. 2 illustrates an stylesheet debugging system, capable of running a visual debugger for stylesheets according to methods exemplary of the present invention.

An XSL Debugging system 200, capable of running the visual XSL Debugger 102 according to methods exemplary of the present invention, is illustrated in FIG. 2. The XSL Debugging system 200 includes a display monitor 202 and a central processing unit 204. The central processing unit 204 may include hardware to network with other computers, long term and short term memory and a processor. As is typical, connected to the central processing unit 204 may be multiple input peripherals such as a keyboard 208 and a mouse 210. The XSL Debugging system 200 may be loaded with a visual debugger for stylesheets for executing methods exemplary of this invention from a software medium 206 which could be a disk, a tape, a chip or a random access memory containing a file downloaded from a remote source.

Figure 3:
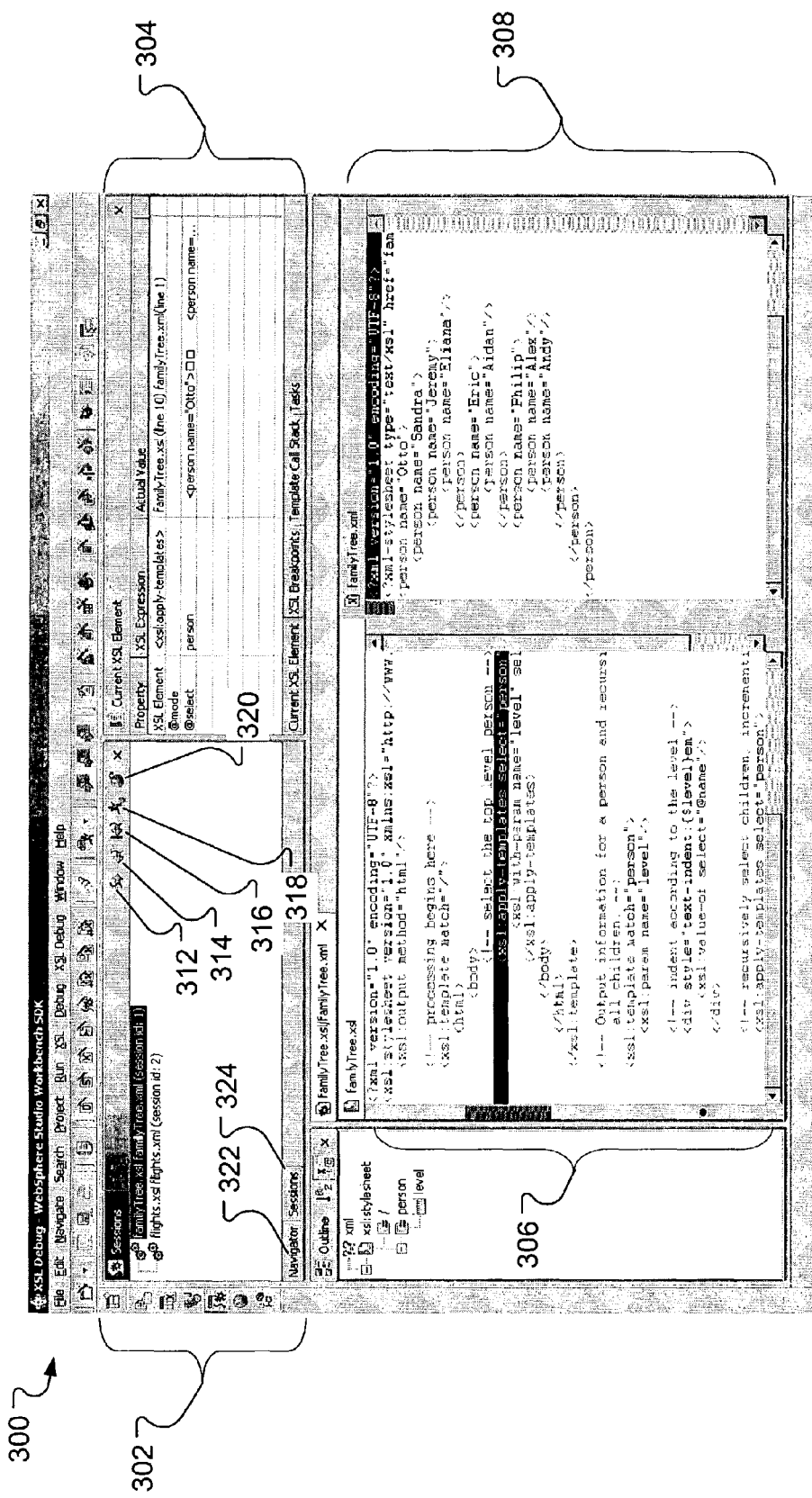
FIG. 3 illustrates a screen shot of an exemplary realization of the stylesheet debugger user interface component according to an embodiment of the present invention.

An exemplary realization of the XSL Debugger user interface component 114 is illustrated in FIG. 3 as an XSL Debugger perspective 300, which may be part of a larger XSL stylesheet development application. The XSL Debugger perspective 300 is made up of a set of "views". Advantageously, within these views, the source XSL stylesheet 104 and the source XML document 106 of interest may be displayed side by side, the source XSL stylesheet 104 in an XSL editor 306 and the source XML document 106 of interest in an XML editor 308. The user may select, e.g., by a double click on a mouse within the XSL editor 306, a location in the source XSL stylesheet 104 at which to set a breakpoint.

The set of views facilitate the debugging process. A "Sessions" View 302 shows the debug sessions that are currently active, so that the user may switch among multiple debug sessions. The Sessions View 302 may also be used to open the new document, formatted in HTML, XML or text, resulting from applying an XSL stylesheet 104 under test to a source XML document 106. At the bottom left of the Sessions View 302 is a tab 322 that allows the user to replace the Sessions View 302 with a "Navigator" View. The Navigator View provides a hierarchical view of the resources in the Workbench (a local site where projects with their related documents reside). Beside the tab 322 for the switch to the Navigator View is a tab 324 to allow a switch back to the Sessions View 302. The Sessions view 302 also includes a number of buttons in the upper left, namely a Trace forward button 312, a Trace backward button 314, a Restart Trace button 316, Run to breakpoint button 318, a Globe button 320 and the conventional Close Window button.

A "Current XSL Element" View 304 shows the template currently under evaluation. As shown in FIG. 3, the Current XSL Element View 304 has column headings for Property, XSL Expression and Actual Value so that the evaluated values of the properties of the template may be displayed. These evaluated properties include XPath expressions such as substring-after(/Contact/PostalAddress/DeliverTo/text( ), ' ')

or attribute values such as "@name". Along the bottom of the Current XSL Element View 304 are tabs that allow a switch to further views. The further views include a "Breakpoints" View, a "Template Call Stacks" View and a "Tasks" View. The Breakpoints View is designed to show a list of breakpoints that have been set. The Template Call Stacks View is designed to show the template call stack as a template is entered and exited. Once breakpoints have been set, say, as above, by double clicking within the source XSL, the user can remove breakpoints from the Breakpoints View. The Tasks View is designed to show a list of any errors that occurred during the transformation.

The XSL Debugger engine component 112 receives and stores the events that are fired from the Xalan processor. For example, consider the following XSL template:

```
<xsl: template match="person">
    <xsl: param name="level"/> (*)
    ...
</xsl:template>
```

Where a given input XML document has a node that matches "person", it is said that a Xalan processor using the XSL stylesheet that includes the above template finds the match and, responsive to finding the match, "enters" the above template. When the above template is entered, the Xalan processor fires an event. The XSL Debugger engine component 112 receives the event, retrieves the template type from the event and evaluates the template within the context of the transformation. For example, the XSL instruction marked with (*) above is an ElemParam object. Evaluating this ElemParam object will return the value for the parameter "level" that is being passed. The returned value may be displayed in the Current XSL Element View 304 of the XSL Debugger user interface component 114.

As will be apparent to a person skilled in the art, there are about a dozen different kinds of XSL instructions (e.g., "for-each", "value-of", "copy-of", etc.). The XSL Debugger engine component 112 provides a framework to handle the evaluation of these XSL instructions and to return the appropriate results for rendering in the XSL Debugger user interface component 114.

To support debugging of an XSL Transformation that invokes external programs written in languages such as Java or JavaScript, a mechanism may be provided wherein a separate virtual machine may be created. Using the separate virtual machine, class paths for the external programs may be set. The Xalan processor may be invoked in the virtual machine environment and the transformation result may be returned to the XSL Debugger user interface component 114 for displaying to the user.

In operation, the user may use the information in the views of the XSL Debugger user interface component 114 to debug XML documents and XSL stylesheets. A single application of a given XSL stylesheet to an XML document of interest may yield information prompting the user to make some changes in either the XML document or the XSL stylesheet or both. As a session may be defined by the XML document and the XSL stylesheet or stylesheets applied to the XML document, such changes may be broadly termed "changes in a session". After making any changes in a session, the user may right-click the session in the Sessions view 302 and select "Relaunch". This action will apply the XSL stylesheet to the XML document again and allow the user to assess the impact of the changes.

Two approaches are contemplated for initiating a session using the present XSL Debugger. In the first approach, the user selects an XSL stylesheet and an XML document of interest, acts to bring up a menu of options and selects an "Apply XSL" menu item. In the second approach, the user may use a "XSL Debugging and Transformation wizard". If the user is simply interested in quickly applying an XSL stylesheet to an XML document to transform the XML document, the user should use the first approach. If, however, the user is interested in providing specific information about the transformation (for example, the location to which to write the transformed output document 110), the second approach, using the XSL Debugging and Transformation wizard, may be preferred.

Additionally, if the user is interested in debugging any XSL stylesheets that call external Java programs, again the XSL Debugging and Transformation wizard may be preferred. In the wizard, a "Remote XSL Application" option may be selected so that the user may specify a class path for the external Java program.

As stated hereinbefore, a user of the visual XSL Debugger may apply an XSL stylesheet to an XML document and create a transformed output document, which may be formatted in XML, HTML or text. Notably, an XSL stylesheet should only be applied to an XML document and in an attempt to create an HTML document if the XSL stylesheet to be applied is designed to provide HTML output. Otherwise, an empty or incorrect HTML document may be created.

If the user selects only an XSL stylesheet or an XML document before selecting "Apply XSL" from the menu of options, the visual XSL Debugger opens a wizard, prompting the user to retrieve an XML document or an XSL stylesheet, whichever is not selected, from the Workbench or from a remote site using, for instance, the Hyper-Text Transfer Protocol (HTTP). If the XML document or the XSL stylesheet is retrieved from a remote site, the Uniform Resource Identifier (URI) of the XML document or the XSL stylesheet must be specified.

If the XML document is retrieved from a remote site, only an XSL transformation will be run on the retrieved XML document. As the retrieved XML document is not available in the Workbench, the debugger cannot be opened on the retrieved XML document. The retrieved XML document can only be transformed and the results displayed.

To apply an XSL stylesheet to an XML document and create a transformed output document formatted in XML, the user of the visual XSL Debugger performs the following steps. The steps are performed using an "XML perspective" related to the XSL Debugger perspective 300 of FIG. 3. The purpose of the availability of different perspectives is to adapt the environment of the visual XSL Debugger to the task at hand. The XML perspective and the XSL Debugger perspective 300 of FIG. 3 are similar in many ways (the toolbar icons for fast access to XML-related wizards are identical). The perspectives differ however in the layout of the views and the views that are visible.

If not already in the XML perspective, the user switches to the XML perspective. In the Navigator view, the user selects an XML document and an XSL stylesheet. By right clicking on one of the selected documents a pop-up menu of options is provided. In the pop-up menu, "Apply XSL>As XML" is selected. Responsive to the selection, the XSL Debugger perspective 300 is opened (see FIG. 3). Using the Sessions view 302, the user may step through the application of the selected XSL stylesheet to the selected XML document to perform a transformation resulting in a transformed output document formatted in XML, ("Apply XSL>As XML" was selected). To view the transformed output document, the user clicks the Globe button 320 in the Sessions view 302.

To apply an XSL stylesheet to an XML document and create a transformed output document formatted in HTML, the above steps are followed, with exception that "Apply XSL>As HTML" is selected from the menu rather than "Apply XSL>As XML". Similarly, the above steps are followed to apply an XSL stylesheet to an XML document and create a transformed output document formatted as text, with exception that "Apply XSL>As Text" is selected from the menu rather than "Apply XSL>As XML".

The transformed output document formatted as text, HTML or XML is automatically saved to the location from which the XSL stylesheet was selected. In a preferred embodiment, the transformed output document will be named "XMLfilename_XSLfilename_transform" with a suffix dependent on the format of output selected (i.e., ".txt", ".html" or ".xml").

If the source XSL stylesheet or the source XML document are changed after the creation of the transformed output document, and the changes are required to be reflected in the transformed output document, the session for the selected XSL stylesheet and XML source documents in the Sessions view 302 may be right-clicked to bring up a pop-up menu in which may be selected "Relaunch". As a result of the selection of Relaunch, the source XSL stylesheet and source XML document are reloaded, the transformation is stepped through and the resultant transformed output document is updated as necessary.

As an alternative to the above document-selection approach, a transformation and debugging session may be initiated using an XSL Debugging and Transformation wizard. As above, the method begins with a switch to the XML perspective. The user then uses the XML perspective menu to select File>New>Other>XML>XSL Debug and Transform. The user then selects the XSL stylesheet to be debugged. If the XSL stylesheet is not in the Workbench, the XSL stylesheet may be imported through the use of an "Import Files" menu item. The XML document to be transformed is then selected by the user. If the XML document is not in the Workbench, the XML document may be imported through the use of the "Import Files" menu item. The user then selects a format for the transformed output document to be XML, HTML or text.

If the output format is selected to be XML or HTML, the user may be invited to provide the XML or HTML version number. The user may also be offered an opportunity to select a character encoding set for the output document. When a character encoding set has been selected, the proper name of the character set will be shown in a read-only Internet Assigned Numbers Authority (IANA) field in the transformed output document. An opportunity may then be given to the user to specify the folder and name of the transformed output document.

The user may select "Remote XSL Application" if the XSL stylesheets that are to be debugged call external Java programs. If "Remote XSL Application" is selected, the user may be prompted to provide a class path to the external Java program. The user may then add Java Archive files and class folders as necessary to the class path and close the wizard by clicking "Finish".

If the XSL stylesheets that are to be debugged do not call external Java programs, the user selects "XSL Application" and closes the wizard by clicking "Finish".

Responsive to the closing of the wizard, the XSL Debugger perspective 300 opens. Using the Sessions view 302, the user may step through the application of the selected XSL stylesheet to the selected XML document to perform a transformation resulting in a transformed output document. To view the transformed output document, the user clicks the Globe button 320 in the Sessions view 302.

Stepping Through Files

The Sessions view 302 displays any sessions that have been run, i.e., any XSL stylesheets have been applied to XML documents. Using the Sessions view 302, the user may visually step through an XSL transformation script, highlighting the transformation rules as the rules are fired. To step forward, the user may click the Trace forward button 312. To step backwards, the user may click the Trace backward button 314. To reset the document, the user may click the Restart Trace button 316. To run to a breakpoint and stop there, the user may click the Run to breakpoint button 318. To open the transformed output document (that is, the document formatted in XML, HTML or text resulting from the transformation) in a Web browser, the user clicks the Globe button 320.

Working in the Template Call Stack View

The Template Call Stack view is designed to show the templates that are currently in the call stack, with the first listed item being the first template called and the last listed item being the most recent (or current) template. When a template is called, the called template is added to the template call stack. When the execution of a template is complete, the competed template is removed from the template call stack.

The Template Call Stack view is divided into four columns titled "Name Template", "Match Template", "Priority" and "Mode".

A name template is a template that may be explicitly called in the XSL stylesheet. Any time a name template (that is, <xsl: template: name>) is called, the pattern matched by the name template will show up in the Name Template column.

A match template is a template that searches for an XPath pattern. Any time a match template (that is, <xsl: template: match>) is called, the pattern that the match template must match is listed the Match Template column.

If there is more than one template that could be instantiated for a node, and the XSLT rules give each template the same priority, a priority attribute can be used to force one template to be called ahead of the others. If a given template has the priority attribute set, the value of the priority attribute will appear in the Priority column.

When a template is created, a mode attribute may be specified, where the mode attribute is given a name to describe the mode. Modes allow an element to be processed multiple times, each time producing a different result. If a given template has a mode attribute set, the value of the mode attribute will appear in the Mode column.

Working in the Current XSL Element View

The Current XSL Element view is divided into three columns titled Property, XSL Expression and Actual Value.

The Property column lists any of the attributes associated with the current XSL element.

The XSL Expression column lists the values of the attributes associated with the current XSL element. It also contains the name of the current XSL element.

The Actual Value column contains the actual value of the XML element or attribute, i.e., the value the XML element or attribute receives by being applied to an XML document. If a given value is very long or required to be seen in a separate viewer, the cell containing the given value may be clicked to result in the display of an arrow button, the arrow button may then be clicked to open a dialog that displays the entirety of the given value.

Working in the Breakpoints View

The Breakpoints view is designed to show the current breakpoints set in the input XSL stylesheets. Breakpoints, in the exemplary embodiment, may not be set in the Breakpoints view.

To set a breakpoint for an XSL stylesheet, the stylesheet may be opened in the XSL editor 306, the cursor may be placed in the line where the breakpoint is required, and Add>Breakpoint may be selected from the pop-up menu. The input XSL stylesheet may automatically have been opened in the XSL editor 306 when the XSL transformation was run.

A breakpoint may be removed from a document in the Breakpoints view by right clicking the breakpoint and selecting Remove in the resultant pop-up menu.

Defining XSL Stylesheet Preferences

The <xsl: stylesheet> element is the root element of nearly all XSL stylesheets. The <xsl: transform> element may also be used. <xsl: transform> has the exact same meaning and syntax as <xsl: stylesheet>.

To define XSL transformation preferences, the user first switches to the XML perspective. The user then selects Window>Preferences>XML>XSL. Then the user selects the "Use <xsl: stylesheet>" radio button if the user prefers to use <xsl: stylesheet> as the root element of the stylesheet. Alternatively, the user may select the "Use <xsl: transform>" radio button if the user prefers to use <xsl: transform> as root element of the stylesheet. The user may then click "Apply" and then "OK" to save the changes. If the preferred root element is changed, the change will not affect any existing XSL stylesheets. The change will only affect XSL stylesheets created after the change is confirmed with clicks on "Apply" and "OK".

Defining XSL Debugging Preferences

To define XSL debugging preferences, the user first switches to the XML perspective. The user then selects Window>Preferences>XML>XSL Debugging.

The "Show All Debugging Files In A Tile Editor" check box may be cleared if it is preferred not to have the source XSL stylesheet and the source XML document "tiled" next to each other. If this check box is selected, the source documents will be displayed together in a single "tile" editor in the XSL Debugger perspective 300. If the check box is cleared, the source documents will be displayed separately in an XSL editor and an XML editor.

The "Run Transformation And Open A Debugging Session" check box should be cleared if it is preferred that a debugging session is automatically opened any time an XSL transformation is run. After a transformation is run, only the transformed output document will be opened in a Web browser.

The "XSL Remote Application" radio button should be selected if debugging is to be performed on any XSL stylesheets that call external Java programs. This will become the default value in a "Select XSL Launcher" page within the XSL Debugging and Transformation wizard and the user will be prompted to specify a class path for the external Java program.

If debugging is to be performed on XSL stylesheets that do not call external Java programs, "XSL Application" should be selected. A Context path may be specified for resolving URIs in <xsl: import>, <xsl: include> and document( ) elements. The Context path value will be prepended to the value in the elements so the Context path can be resolved both in the Workbench and the run-time environment.

As described hereinbefore, in the visual XSL Debugger preferences page (Select Window>Preferences>XML>XSL Debugging) a Context path may be specified for resolving URIs in <xsl: import>, <xsl: include> and document( ) elements.

If the XSL stylesheet under test uses the <xsl: import>, <xsl: include> or document( ) function to reference other stylesheets or documents, the reference to the other stylesheets or documents should be formatted with an awareness of the default URI resolution mechanism. The default URI resolution mechanism may, for instance, be based on a relative path. In which case, the user of the visual XSL Debugger should format a pointer such that the pointer indicates a file location of the referenced stylesheet or document relative to the file location of the XSL stylesheet containing the reference.

For example, consider a directory structure wherein XSL stylesheets named "First.xsl" and "Second.xsl" are stored in a directory called "Project1" and an XSL stylesheet named "Third.xsl" is stored in a subdirectory of Project1 called "Common". If it is required that First.xsl references Second.xsl and Third.xsl, import statements such as the following should be used: <xsl: import href="Second.xsl"/>; <xsl: import href="Common/Third.xsl"/>. The default URI resolution mechanism will resolve the Second.xsl and Third.xsl file relative to the First.xsl file by appending the href attribute value (for example, Second.xsl) to the file location of First.xsl.

Sometimes, this resolution mechanism is not enough. For example, it may be required to set up stylesheets so the stylesheets will work in a given run-time environment in addition to working in the Workbench. Where an import statement such as <xsl: import href="/MyWebProject/xsl/MyFile.xsl"/>(note the leading "/" in the href attribute) is used, the default URI resolution mechanism may not work properly. The default URI resolution mechanism is designed to resolve this URI relative to the current drive. That is, the default URI resolution mechanism will resolve the import statement to something like C:/MyWebProject/xsl/MyFile.xsl, which may not be the actual location of MyFile.xsl.

The ability to define a Context path enables work with such a stylesheet in the Workbench without having to modify the stylesheet. In the Context path field, the user may specify a directory path to be prepended to the href attribute value during URI resolution. For example, assuming the location for MyFile.xsl is "C:/eclipse/workspace/MyWebProject/xsl/MyFile.xsl", the Context path may be defined as "C:/eclipse/workspace".

As discussed in conjunction with the description of the Sessions View 302 hereinbefore, the visual debugger for stylesheets of the present invention has the ability to support multiple debugging sessions. An extension of this ability allows the debugging of stylesheets that include or import other stylesheets. Any "supplementary" stylesheets included by, or imported into, a given "main" stylesheet that has been opened in the visual XSL Debugger may be opened in supplementary debugging sessions. The current context of each of the supplementary stylesheets may be maintained by the visual XSL Debugger while the main stylesheet is applied to a given XML document. As the supplementary debugging sessions behave as any other debugging session, the user may step through the supplementary stylesheets as described hereinbefore.

In addition to support for stylesheets including other stylesheets, the visual XSL Debugger may provide support for XML documents that include stylesheets. In particular, the "?xml-stylesheet" processing instruction may be used in a given XML document to include a stylesheet. Upon encountering such an instruction, the visual XSL Debugger processes the instruction, locates the stylesheet and continues as usual.

Consider an example wherein a user is creating a stylesheet to result in a display of data found in an xml file 400 called familyTree.xml (see FIG. 4) in HTML format.

An initial attempt is illustrated in FIG. 5 as an xsl file 500 called familyTree.xsl. However, when familyTree.xsl 500 is run against familyTree.xml 400, the resultant HTML page is empty. The problem may be that the person template (the code that starts with <xsl:template match="person">) is not called or fired. Alternatively, the problem may lie in the recursion within the person template itself (note that the person template calls itself within the body of the template). Further, the problem could be in the XPath expression that is used to display a person's name. In the instruction <xsl:value-of select="name"/>, the portion within quotes is the XPath expression. The visual Debugger for stylesheets disclosed herein may be used by the user to assist in debugging familyTree.xsl 500.

In particular, the user may launch the visual Debugger within an Application Developer Workbench environment by right clicking an indication of the familyTree.xml document in the Navigator view and selecting "Apply XSL>As HTML"

from the pop-up menu. Note that the user does not have to explicitly select the stylesheet because familyTree.xml uses the "?xml-stylesheet" processing instruction to include familyTree.xsl. The menu selection leads to familyTree.xsl 500 being opened in an XSL editor window 600 (FIG. 6) and familyTree.xml 400 being opened in an XML editor window.

Once the visual Debugger has been launched with familyTree.xsl 500 and familyTree.xml 400, the Xalan processor 108 (FIG. 1) is instructed by the XSL Debugger engine component 112 to apply familyTree.xsl 500 to familyTree.xml 400. While applying farmilyTree.xsl 500 to familyTree.xml 400, the Xalan processor 108 fires multiple events. These events are collected and interpreted by the XSL Debugger engine component 112 so the application of familyTree.xsl 500 to familyTree.xml 400 may be simulated for the benefit of the user.

To identify the problem, the user may set a breakpoint on the <xsl: value-of select="name"/> instruction within the person template. The user accomplishes this breakpoint setting by double clicking in the margin of the XSL editor window 600 directly in line with the corresponding instruction. The user can then click the Run to breakpoint button 318 in the Sessions view 302 (FIG. 3). The simulation of the application of familyTree.xsl 500 to familyTree.xml 400 is performed by the XSL Debugger engine component 112 and stopped at the specified breakpoint. Thus, it is confirmed that the person template does get called.

To eliminate recursion as the problem, the user may open the Template Call Stack view by selecting the appropriate tab in the upper right hand view (shown as Current XSL Element View 304 in FIG. 3). The user may then continue to click the Run to breakpoint button to allow the XSL Debugger engine component 112 to continue performing the simulation. By carefully monitoring the Template Call Stack view while the simulation is performed, the user may verify that the call stack adds and removes the person template appropriately. An exemplary Template Call Stack view 700 is illustrated in FIG. 7. Once recursion has been removed as the potential problem in this way, an incorrect XPath expression is left as the likely problem area.

The user may test or modify the XPath expression by editing familyTree.xsl 500. The problem may, for instance, be that the expression "name" is attempting to access an attribute and not an element in the xml document, so there is a missing "@". After editing the stylesheet, the changes may be saved by the user by way of a right click inside the xsl editor and the selection of save from the resulting menu. In the Sessions view, the user may right click and select Relaunch from the resulting pop-up menu options to update the transformation with the changes. Responsive to the relaunch, the Xalan processor 108 is instructed by the XSL Debugger engine component 112 to apply the edited version of familyTree.xsl to familyTree.xml 400. As before, while performing the transformation, the Xalan processor 108 fires events that are collected and interpreted by the XSL Debugger engine component 112. Additionally, the Xalan processor 108 generates a newly transformed output document. The user may then click the Globe button 320 in the Session view to open the newly transformed output document in a Web browser to verify that the changes indeed solved the problem.

As will be apparent to a person skilled in the art, the XSL Debugger engine component 112 need not necessarily collect and store the events for use in performing a simulation of the application of the selected stylesheet to the selected source file. Instead, if the application programming interface of the stylesheet processor allows, instructions related to the wishes expressed by the user via the XSL Debugger user interface component 114 may be directly sent to the stylesheet processor and the display updated responsive to reception of each event from the stylesheet processor.

Advantageously, such a visual debugger for stylesheets as disclosed herein provides much needed assistance to those debugging stylesheets that are under development.

Other modifications will be apparent to those skilled in the art and, therefore, the invention is defined in the claims.

What is claimed is:

1. A method of providing support for stylesheet debugging, said method comprising:
   providing a user interface including a display, said user interface adapted to receive an indication of a source document and a stylesheet to be applied to said source document, wherein the display includes one or more views, the views being selectable by a user to manipulate a simulation of an application of the stylesheet to the source document;
   instructing a stylesheet processor to launch application of said stylesheet to said source document;
   receiving a plurality of events from said stylesheet processor, where said plurality of events relate to said application of said stylesheet to said source document, and
   updating said display based on said plurality of events.

2. A computer readable medium containing computer-executable instructions which, when performed by a processor in a computer system, cause said computer system to:
   provide a display of a source document and a stylesheet to be applied to said source document, wherein the display includes one or more views, the views being selectable by a user to manipulate a simulation of an application of the stylesheet to the source document;
   instruct a stylesheet processor to launch application of said stylesheet to said source document;
   receive a plurality of events from said stylesheet processor, where said plurality of events relate to said application, by said stylesheet processor, of said stylesheet to said source document, and
   update said display based on said plurality of events.

3. The computer readable medium of claim 2 wherein said stylesheet is an eXtensible Stylesheet Language (XSL) stylesheet.

4. The computer readable medium of claim 3 wherein said stylesheet processor is an eXtensible Stylesheet Language Transformation (XSLT) stylesheet processor.

5. The computer readable medium of claim 4 wherein said XSLT stylesheet processor is the Xalan processor.

6. The computer readable medium of claim 2 wherein said source document is formatted in the eXtensible Markup Language.

7. The computer readable medium of claim 2 wherein said computer-executable instructions further cause said computer system to perform a simulation of application of said stylesheet to said source document.

8. The computer readable medium of claim 7 wherein said display allows a user to set a breakpoint on said stylesheet and said computer-executable instructions further cause said computer system to stop said simulation of application of said stylesheet to said source document.

9. The computer readable medium of claim 7 wherein, where a given one of said plurality of events indicates a firing of a template rule, said computer-executable instructions further cause said computer system to single step through said simulation as said simulation relates to said template rule.

10. The computer readable medium of claim 2 wherein, where said event indicates a firing of a template rule, said computer-executable instructions further cause said computer system to evaluate said template rule.

11. The computer readable medium of claim 2 wherein said stylesheet calls an external program and said computer-executable instructions further cause said computer system to create a separate virtual machine to run said external program.

12. The computer readable medium of claim 11 wherein said external program is written in a JAVA programming language.

13. The computer readable medium of claim 11 wherein said external program is written in a JAVASCRIPT programming language.

14. The computer readable medium of claim 2 wherein said stylesheet is a first stylesheet, said first stylesheet imports a second stylesheet and said computer-executable instructions further cause said computer system to open a supplementary debugging session.

15. The computer readable medium of claim 2 wherein said stylesheet is a first stylesheet and said source document includes an instruction referencing a second stylesheet and said computer-executable instructions further cause said computer system to processes said instruction and locate said second stylesheet.

16. The computer readable medium of claim 2 wherein the one or more views includes at least one of currently active debug sessions, locally residing resources and related documents, a list of set breakpoints, a template call stack, and a list of transformation errors.

17. The computer readable medium of claim 2 wherein said display includes a user interface related to an editor for said stylesheet and a user interface related to an editor for said source document.

18. The computer readable medium of claim 2 wherein said computer-executable instructions further cause said computer system to:

receive an indication that changes have been made to said stylesheet resulting in an edited stylesheet; and instruct said stylesheet processor to apply said edited stylesheet to said source document.

19. A stylesheet debugging system comprising:

a display monitor adapted to provide a display of a source document and a stylesheet to be applied to said source document, wherein the display includes one or more views, the views being selectable by a user to manipulate a simulation of an application of the stylesheet to the source document;

a processor adapted to:
  instruct a stylesheet processor to launch application of said stylesheet to said source document;
  receive a plurality of events from said stylesheet processor, where said plurality of events relate to said application of said stylesheet to said source document; and
  update said display based on said plurality of events.

20. A computer readable medium containing computer-executable instructions which, when performed by a processor in a computer system, cause said computer system to:

provide a user interface including a display, said user interface adapted to receive an indication of a source document and a stylesheet to be applied to said source document, wherein the display includes one or more views, the views being selectable by a user to manipulate a simulation of an application of the stylesheet to the source document;

instruct a stylesheet processor to launch application of said stylesheet to said source document; receive a plurality of events from said stylesheet processor, where said plurality of events relate to said application of said stylesheet to said source document; and update said display based on said plurality of events.

* * * * *